(No Model.)

F. E. SOUTHARD & A. E. KLAUSER.
MANUFACTURE OF RUBBER TIRED WHEELS.

No. 420,610. Patented Feb. 4, 1890.

Attest:
H. F. Shunck
Wesley Royce

Inventor:
Frank E. Southard
Arthur E. Klauser
By Almon Hall their Atty.

UNITED STATES PATENT OFFICE.

FRANK E. SOUTHARD AND ARTHUR E. KLAUSER, OF TOLEDO, OHIO.

MANUFACTURE OR RUBBER-TIRED WHEELS.

SPECIFICATION forming part of Letters Patent No. 420,610, dated February 4, 1890.

Application filed December 4, 1889. Serial No. 332,509. (No model.)

*To all whom it may concern:*

Be it known that we, FRANK E. SOUTHARD and ARTHUR E. KLAUSER, of Toledo, Lucas county, Ohio, have invented a new and useful Improvement in the Art of Manufacturing Vehicle-Wheels, of which the following is a specification.

Our invention relates to gutta-percha or india-rubber tires, and more particularly to the method of securing them to the rim of the wheel in that class of wheels in which the metallic rim is turned inwardly, forming flanges, which engage and hold the rubber tire in place. In this class of wheels it has been the practice to stretch the vulcanized rubber over the rim of the wheel, and then to turn the flanges of the rim of the wheel inwardly, so as to pinch and engage the rubber tire. In such case it has been usual to vulcanize the inner part of the tire harder than the outer part, so that it cannot be compressed or stretched, thus preventing that part of the rubber tire held between the flanges from being pulled out. It is found that rubber vulcanized in this fashion breaks easily and is not durable. In another wheel of this class soft unvulcanized rubber is molded into the flanged recess of the rim in the form of a tire and is vulcanized in place. In this wheel the vulcanizing takes place uniformly and the finished tire is soft and elastic throughout, so much so that it is found that a violent pull or wrench may pull the rubber tire from its seat in the flanged recess of the rim of the wheel.

The object of our invention is to obviate the objections here indicated and to provide a method of preventing the compression or collapse of the rubber tire within its flanged recess, so that the rubber cannot be pulled or stretched out of place. We attain these objects by means of the devices and method hereinafter described, and illustrated in the accompanying drawings, made part hereof, in which—

Figure 1:
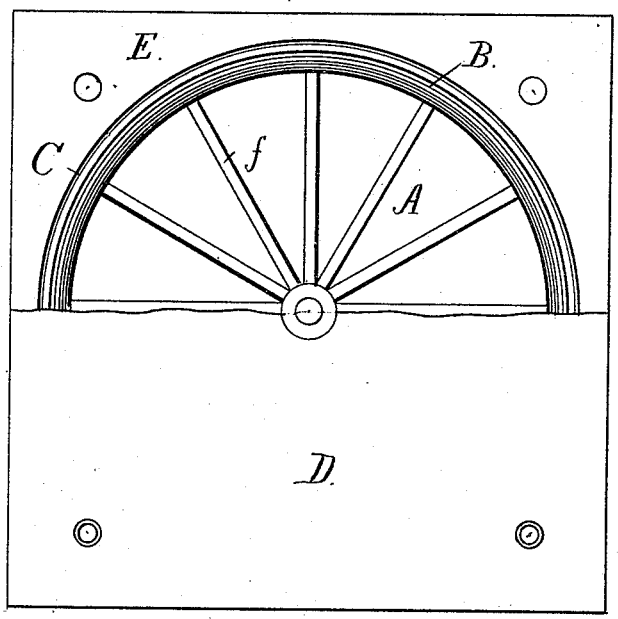
Figure 2:
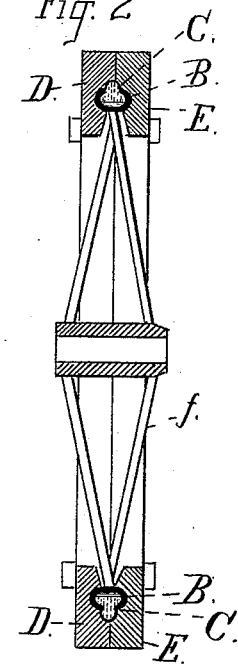
Figure 3:
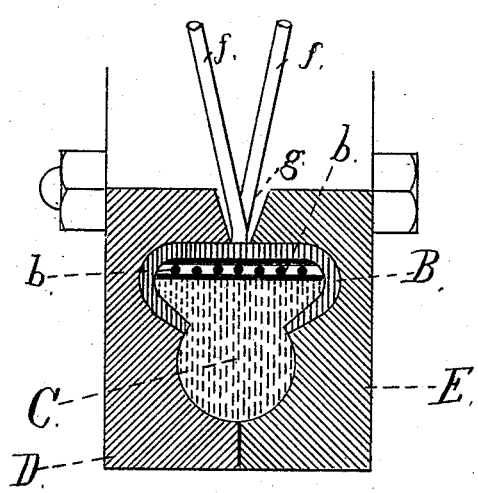
Figure 4:
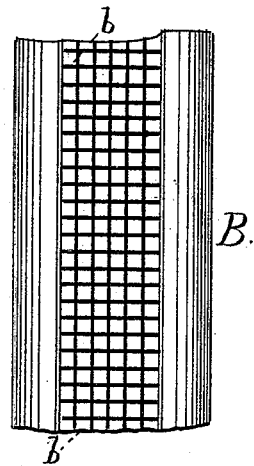

Figure 1 is a plan view of the mold or matrix in which our tire is compressed, given its finished shape, and vulcanized, with the wheel in place therein, a part of the upper plate of the mold being removed; Fig. 2, a diametrical cross-section of the same; Fig. 3, a portion of view shown in Fig. 2, enlarged; and Fig. 4 is an enlarged plan of a portion of the recessed rim with the tape, hereinafter referred to, in place before the introduction of the india-rubber tire.

The same letters of reference are used to indicate like parts in the several views.

Wheel A is provided with metal rim B, having its edges turned inwardly, so that a flanged channel or recess is formed on the periphery of the rim throughout its circumference. In the bottom of this recess and entirely around the wheel is placed a tape *b*. This tape may be composed of any suitable substance, preferably a tape composed of soft vulcanized india-rubber, or a compound of india-rubber and other substances, formed on and having for its foundation wire-cloth or what is known as "wire-gauze," or the tape may be formed of wire-gauze alone, or perforated metal, or of any fabric of sufficient body to prevent the rubber tire, which is afterward superimposed upon it, from collapsing, so as to permit it to be drawn from its flanged recess. A chain of flat links or a series of pieces connected or disconnected may be so arranged on the bottom of the flanged recess as to serve the same purpose; but such arrangement of parts would be the obvious mechanical equivalent of the tape *b* referred to.

The compounded rubber to be used in making the rubber tires, while in a doughy state, is forced through a die to approximately the shape in cross-section of the completed rubber tire. The rubber comes from the die like a rope, from which lengths equal to the circumference of the wheel are cut off. These pieces C, still soft, are placed around the rim, their ends united, and that part of the rubber rope corresponding to the flanged recess of the rim B is pressed loosely into such recess. The wheel is now placed in a mold or matrix consisting of two metal plates D E, recessed in their adjoining faces to receive the rim and tire. The recesses in plates D E, when brought together, are in cross-section the shape of the exterior of rim B and the completed rubber tire and are in plan a true circle. Plates D E have circular openings in their center designed to receive the hub and the spokes of the wheel, and are cut away to leave space for the outer ends of the spokes *f* where they enter the rim B, as shown at *g*. The wheel, with its tire of soft doughy unvulcanized rubber, being placed between the two plates D E, these plates are brought and held closely together by clamps or other suitable means, and the rubber is thus forced into the recesses of the rim and of the mold, filling and conforming to them, and also closely uniting with tape *b*. If the tape have open meshes or be composed of links or like parts, the soft rubber under pressure nearly or quite envelops these parts. If the tape consists of rubber or a composition of rubber and other substances, a close union of the tape and rubber tire takes place. In either case that part of the rubber tire within the flanged recess, upon being vulcanized, becomes so rigid that it is almost impossible to pull the tire from its seat without destroying the tire. The plates D E and rim B, with their recesses, now together form a flask, within which the soft rubber may be vulcanized. The mold containing the whole being subjected to a proper degree of heat for a suitable time, the rubber tire is vulcanized in place to the required degree of hardness and elasticity and in close union with tape *b* or its equivalent appliance. The wheel is now removed from the mold with the rubber tire finished and complete and held firmly in place by the flanged metal rim and by that part of the india-rubber made rigid and inelastic by tape *b*.

What we claim as our invention, and desire to secure by Letters Patent, is—

The art of making rubber-tired wheels, which consists in molding unvulcanized india-rubber upon a metal rim or tire provided with inwardly-projecting flanges adapted to receive and retain the india-rubber, the recess formed by said flanges being provided with a tape of suitable material adapted to give rigidity to that part of the india-rubber tire within such recess, and then vulcanizing the india-rubber tire in place, substantially as shown and described, for the purpose specified.

FRANK E. SOUTHARD.
ARTHUR E. KLAUSER.

Witnesses:
 H. F. SHUNCK,
 F. B. HOLLENBECK.